INVENTOR

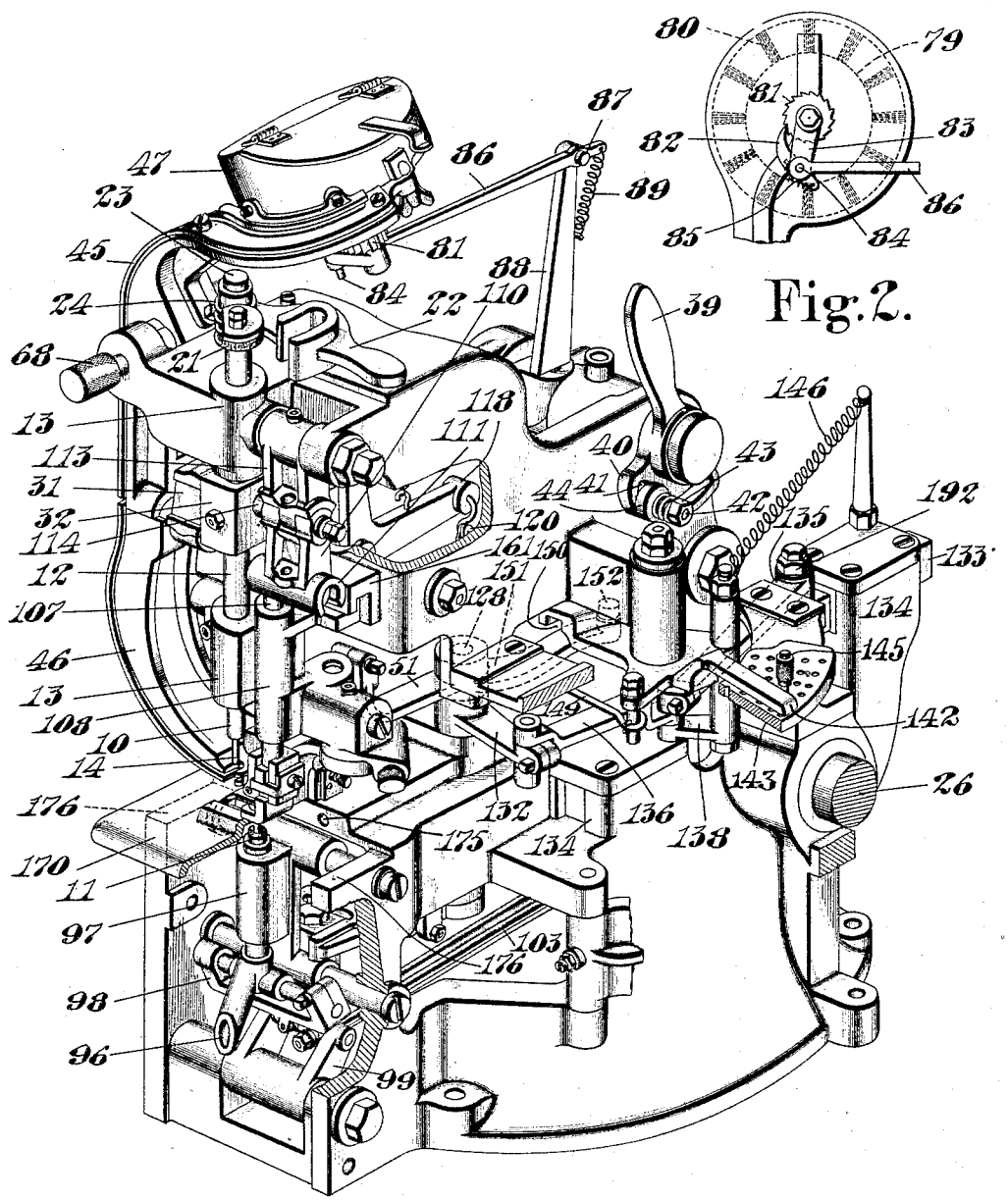

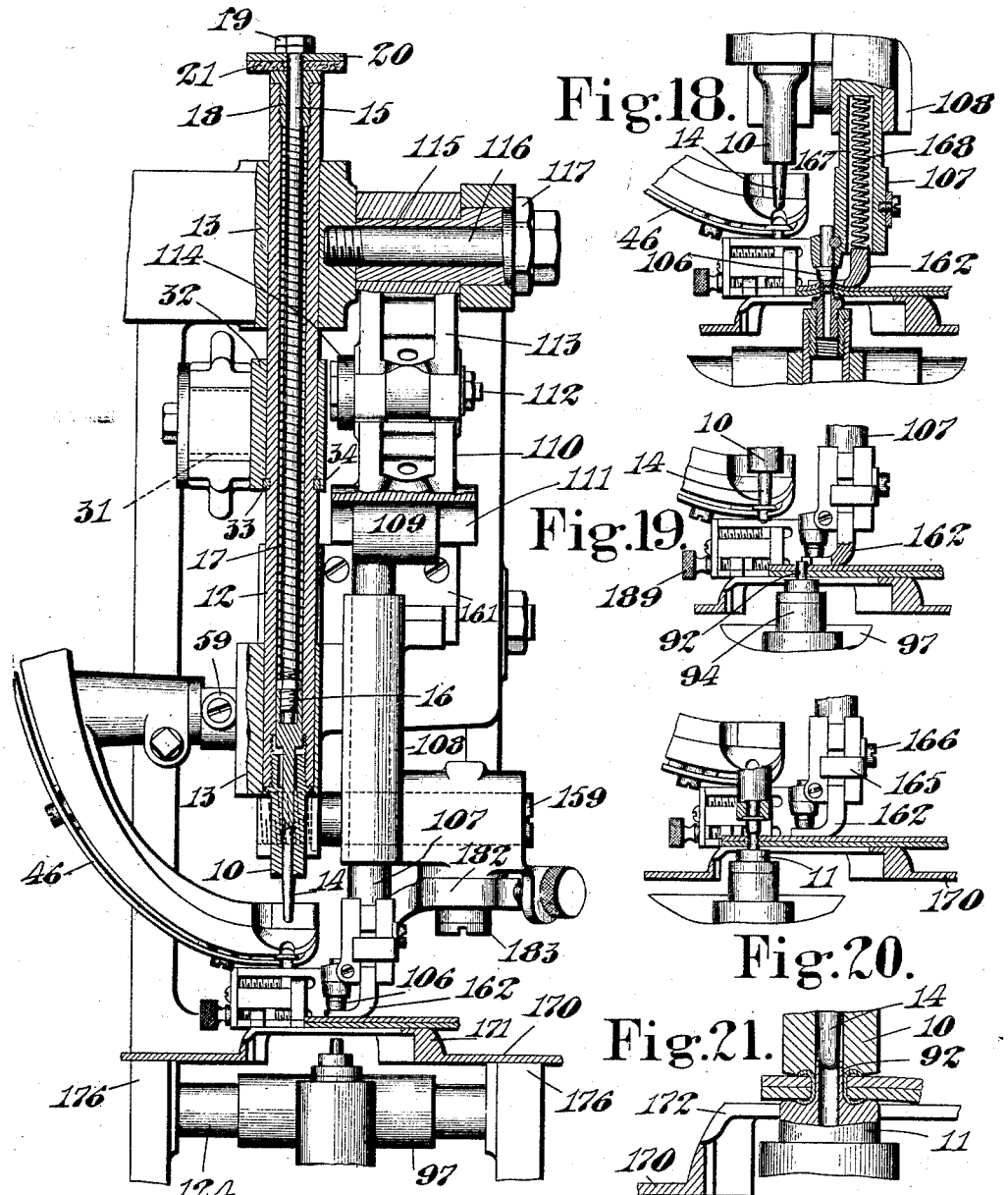

Patented Jan. 22, 1929.

1,699,696

UNITED STATES PATENT OFFICE.

PERLEY R. GLASS, OF WAYLAND, MASSACHUSETTS, ASSIGNOR TO UNITED SHOE MACHINERY CORPORATION, OF PATERSON, NEW JERSEY, A CORPORATION OF NEW JERSEY.

FASTENER-INSERTING MACHINE.

Application filed September 11, 1919, Serial No. 323,164. Renewed February 3, 1926.

This invention relates to fastener-inserting machines. The invention is illustrated herein as embodied in an eyeleting machine of the step-by-step single eyelet type. In machines of the type mentioned the work is fed step by step and eyelets are set one by one in holes punched automatically as the work is fed. This preliminary general description is not to be understood as having any limiting effect upon the features of the invention hereinafter described and claimed.

The invention relates more particularly to the type of machine that punches holes in the work for the reception of the fasteners, feeds the work step by step, and includes a magazine to supply the fasteners to the setting tools. Among the objects of the invention are the following: to provide improved means for disposing of the punchings so that the latter will not interfere with the work or operation of the machine or deposit dirt in the bearings of the working parts; to provide improved means for preventing the setting of fasteners when it is desired to use the machine merely for punching holes or when it is desired to test it without setting fasteners; to provide improvements in various parts of the mechanism with a view to obtaining better operation, adjustment, wearing qualities and accuracy, and facilitating assembling and taking apart, and to provide an improved mode of cooperation of the fastener-setting tools and improved mechanism for operating said tools accordingly.

The improved raceway organization illustrated herein form the subject-matter of United States Letters Patent 1,534,108, granted April 21, 1925, pursuant to an application filed by me as a division of this application.

The foregoing features and others not heretofore mentioned are hereinafter described and claimed and are illustrated by the accompanying drawings.

In the drawings,

Fig. 1 represents a perspective view of an eyeleting machine embodying a preferred form of the present invention, some parts of the machine being represented as being broken out so as to disclose certain features that would otherwise be concealed from view;

Fig. 2 represents an inverted plan view of the hopper or magazine by which fasteners are fed into the raceway;

Fig. 17 is a front elevation, partly in section, including the tools by which the work is punched and fed and by which the eyelets are set. This figure shows the several tools in their respective initial positions;

Figs. 18, 19, 20 and 21 show successive stages of operation of the structure included in Fig. 17, Fig. 21 showing the setting tools on a relatively large scale as being in the final stage of setting an eyelet;

Fig. 22 is a sectional view in a vertical plane of the adjusting means by which the indicating elements of the gage may be adjusted independently of and relatively to each other. The plane of this section is indicated by line 22—22 of Fig. 23;

Fig. 23 represents another sectional view of the structure shown by Fig. 22 and includes a work-guide. The plane of this section is indicated by line 23—23 of Fig. 22; and Fig. 24 is a perspective view, partly in section, of improved means for connecting the plunger of one of the setting tools with the mechanism by which it is moved to clench the eyelet.

*Upper setting tool and spindle.*

Figure 3:
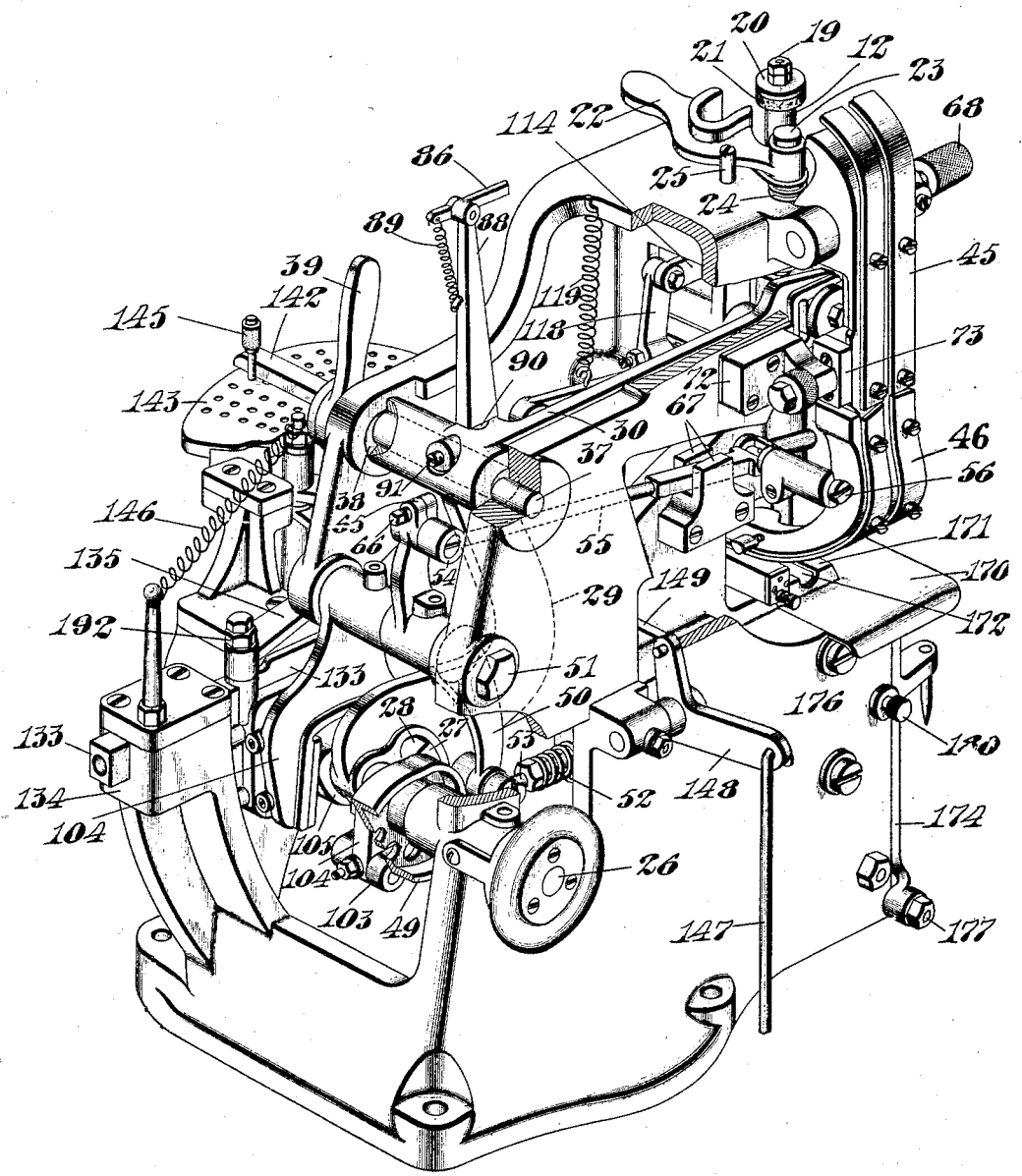
Fig. 3 represents a perspective view of the machine as seen from a point diametrically opposite that of Fig. 1, some parts being broken away so as to show certain features that would otherwise be concealed from view.

The eyelet-setting tools are indicated respectively at 10 and 11. According to the type of machine illustrated the eyelets are delivered to the upper tool and are carried downwardly thereby. The upper tool, as shown, is fastened to the lower end of a plunger 12 and the latter is arranged to slide in stationary bearings 13, 13 formed in the main frame of the machine. According to usual practice the tool 10 is bored to receive a spindle 14 by which the eyelets are taken from the supplying means and supported frictionally in concentric relation to the tool during transference to the work. The spindle 14, according to usual practice, is normally maintained in operative position by a spring and is capable of being forced back into the setting tool when the clenching operation occurs. According to the present invention, however, provision is made for retracting the spindle relatively to the transferring tool so as to prevent the spindle from taking an eyelet from the supplying means. As shown by Fig. 17 the spindle is formed in two sections the lower one of which is indicated by the numeral 14 and the upper one of which is indicated at 15. The two sections are joined by being screwed one into the other as indicated at 16. The upper section is provided with a lock nut by which accidental unscrewing is prevented. The spring for normally projecting the spindle from the setting tool is indicated at 17, this spring being maintained under compression by a plug 18 screwed into the upper end of plunger 12, said plug serving also as a bearing in which the upper end of section 15 may slide. Section 15 is provided with a head arranged externally of the plunger, said head affording convenient means by which the lower end of the spindle may be retracted into the setting tool. As shown the head comprises co-operative nuts 19, a metal disk or washer 20, and a disk 21 of relatively soft material such as leather, the latter being provided to avoid noise when the head is caused to strike an abutment interposed in its path. Any convenient means may be used to effect retraction of the lower end of the spindle relatively to the tool, the means provided in the present instance being a manually movable arm 22 (Figs. 1 and 3) mounted upon the upper part of the main frame and connected to the latter by a pivot stud 23. This arm is normally held out of the path of the head by a spring 24 but is maintained in close relation to the plunger by a stop 25. When, for any reason, it is desired to actuate the machine without setting eyelets, the arm 22 may be moved to a position where it will underlie the head of the spindle, the initial position of the head being slightly above the plane of the top of the stop arm. So long as the stop arm is held in the path of the head it will prevent the spindle from moving downwardly but will not interfere with the reciprocation of the plunger 12.

The plunger 12 is reciprocated by a crank carried by the main driving shaft 26. This shaft is mounted in bearings at the rear of the main frame. The crank mechanism is substantially like that shown by Fig. 5 in Letters Patent of the United States No. 1,228,768 granted June 5, 1917 on an application of mine, and it imparts motion to a lever through the medium of a block 27 arranged to slide in a curved slot 28 formed in the lever. This lever comprises arms 29 and 30 and is in the form of a bell-crank. The forward end of arm 30 (see Figs. 12 and 17) is forked and embraces a block 31. This block has a swivel connection with a block 32, the latter being affixed to plunger 12. The block 32 is bored to receive the plunger, the latter being circular in cross-section as shown by Fig. 24. The connection between block 32 and the plunger is designed to facilitate assembling and taking apart these elements, and avoids the possibility of losing the desired relation in consequence of downward stress exerted by the operating lever when the resistance of the clenched eyelet is greatest. As shown by Fig. 17 the plunger is provided with an external annular groove in which a metallic ring 33 is set, the ring and the plunger being thus interlocked positively and the ring providing a shoulder or abutment for transmitting downward motion of block 32 to the plunger. This ring, as shown by Fig. 24, is split, and when assembling these parts the ring may be expanded sufficiently to enable it to slide along the plunger. When the ring reaches a position in registration with the groove it contracts automatically into the groove, and in order to maintain the ring positively in interlocked relation with the plunger the block 32 is counterbored to provide an annular flange 34 which surrounds and confines the ring when the parts are fully assembled. The block is provided with a set screw 35 by which it is prevented from slipping upwardly relatively to the plunger, and since there is never any great resistance to upward movement of the plunger the set screw is sufficient to maintain the block in co-operative relation to the split ring. As shown by Fig. 24 the plunger is provided with a groove 36 in which the inner end of the set screw is seated.

Referring to Fig. 3, the fulcrum of the lever 29, 30 is a pin the end portions of which are indicated at 37, 38 respectively. These end portions are concentric in relation to each other but portion 38 has greater diameter than portion 37. Portions 37 and 38 are arranged to turn in bearings in the main frame. The lever 29, 30 is arranged between the two bearings and that portion of the pin that extends through the lever is eccentric relatively to the end portions in order to provide means for adjusting the setting tool 10 so that it will approach tool 11 more or less closely according to the thickness of the work in which the eyelets are to be set. The fulcrum pin is preferably provided with a handle 39 by which it may be turned to effect adjustment. This handle is fixed to end portion 38 and, as shown by Fig. 1, is provided with a flange 40 in which is formed a concentric slot 41. A stud 42 affixed to the frame projects through the slot and its outer end is provided with a nut 43. A disk 44 is arranged loosely on the stud in position to bear against the outer face of flange 40, and a compression spring interposed between the disk and the nut maintains sufficient pressure against the flange to hold the handle frictionally in any position at which it may be left. By moving the handle 39 in one direction or the other the range of reciprocation of the plunger 12 may be shifted instantly without requiring the use of any tool.

*Raceway.*

The raceway, in the present instance, is arranged to supply eyelets to the upper setting tool. A characteristic novel feature of the raceway is that only a relatively small part of it is reciprocated to present eyelets to the setting tool. This feature, according to the illustrated embodiment of the invention, is made possible by constructing the raceway in sections and by joining the latter so that only the section that includes the delivery end of the raceway is required to move. According to the design shown the raceway is made in two sections and the latter are indicated respectively at 45 and 46, the upper section 45 being provided with a hopper 47 from which the eyelets are fed by mechanism hereinafter described. In the present instance the sections 45 and 46 are connected by a pivot joint shown in detail by Fig. 6, and comprising a pivot stud 48. The two sections are mortised one into the other so that they will remain always in registration with each other to permit the eyelets to pass from the upper section to the lower without encountering any obstruction. The axis of the pivotal joint extends from side to side of the machine so that the delivery end of the raceway may move from front to rear. Consequently, although the eyelets move from left to right as they approach the delivery end of the raceway, the delivery channel of the raceway extends from front to rear, as shown in Fig. 1.

The mechanism for reciprocating the lower section of the raceway is shown by Fig. 3. Delivering motion is derived from a cam 49 carried by the drive shaft 26. A lever 50 mounted upon a fulcrum member 51 is provided with a roll arranged to run on the cam, and the roll is maintained in contact with the came by a compression spring 52 surrounding a plunger 53 connected to the lever. The upper part of the lever carries a stud 54 by which pivotal connection is formed with the rear end of a link 55. The forward end of this link is pivotally connected to the lower raceway section by a pivot stud 56. In order to facilitate connecting the link to and disconnecting it from the raceway the forward end of the link is formed with a U-shaped portion 57 (Fig. 8) adapted to embrace a portion 58 of the stud. The link may thus be connected and disconnected by swinging it about its rear pivot stud 54. The forward portion of the link projects beyond the U-shaped portion sufficiently to provide a handle portion 59, and this handle portion is made hollow to receive a spring-follower 60 the function of which is to maintain connection between the link and the raceway and at the same time to permit instantaneous disconnection without requiring the use of a tool. The follower 60 is backed by a compression spring 61 and the latter is maintained under constant compression by a plug 62 screwed into the end of the handle.

Figures 6, 7, 8:
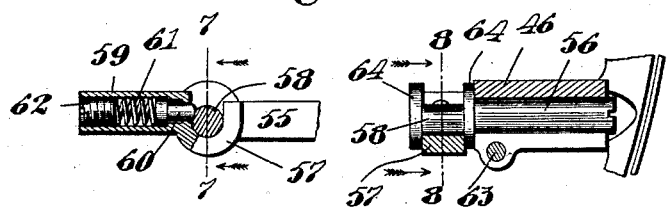
Fig. 6 is a sectional view of the joint by which two relatively movable sections of the raceway are connected.
Fig. 7 is a sectional view of the connection between the movable section of the raceway and the disconnectible link by which it is reciprocated. The plane of this section is indicated by line 7—7 of Fig. 8.
Fig. 8 represents another view of the structure shown by Fig. 7, the direction of view being indicated by line 8—8 of Fig. 7.

In order to provide for adjusting the delivery end of the raceway so that it will deliver the leading eyelet in coaxial registration with the spindle 14 the pivot studs 54 and 56 are provided with eccentric portions having an aggregate range of adjustment sufficient to correct any error in machining that would be likely to occur. For example, as shown by Fig. 7, the portion 58 is eccentric relatively to the portion 56, and the right hand end of the stud projects from the raceway and is provided with a screw-driver slot by which it may be turned for the purpose of effecting adjustment. That portion of the raceway section through which the stud extends is split so that it may be contracted by screw 63 to clamp the stud. That portion of the stud with which the connecting link is engaged is provided with flanges 64 arranged to engage the sides of the link to prevent lateral displacement of the latter. The pivot stud 54 at the rear end of the link is clamped by a split portion 65 of the operating lever, said split portion having a clamping bolt 66, and stud 54 being provided with a slot to receive a screw-driver so that it may be turned for the purpose of effecting adjustment.

Since, as hereinbefore stated, it is desirable to minimize the weight of the reciprocatory elements in order to make very high speed possible without excessive vibration, the link 55 may be made relatively slender and light provided it is braced to prevent it from buckling between the two points of pivotal connection. Accordingly, the invention includes means for this purpose, said means as shown comprising a block affixed to the main frame and provided with guiding portions 67 arranged to engage opposite sides of the intermediate portion of the link. These portions 67 serve also to maintain the link against lateral displacement when the link is disconnected from the raceway, and the lower portion of the block serves to support the forward end of the link when the latter is disconnected.

Figures 9, 10, 11:
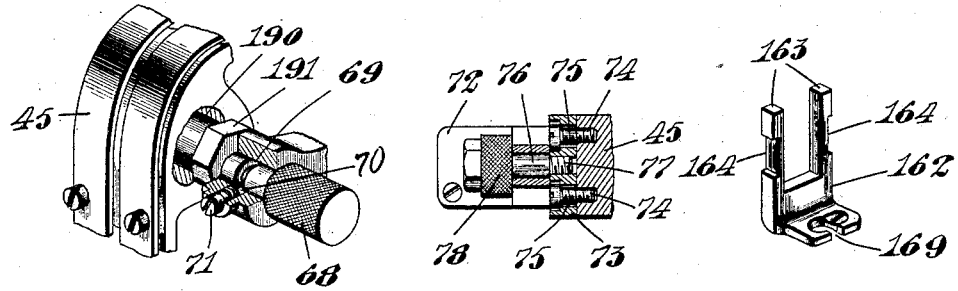
Fig. 9 is a perspective view, partly in section, including a stationary portion of the raceway and an adjustable pin for attaching it to the frame of the machine.
Fig. 10 is a sectional view in a vertical plane from front to rear through an adjustable device that serves conjointly with the structure shown by Fig. 9 to attach the stationary part of the raceway to the frame of the machine. This adjustable device enables the path of reciprocation of the delivery end of the raceway to be adjusted laterally.
Fig. 11 is a perspective view of an improved presser foot.

The upper section of the raceway is fastened to the frame by a coupling pin 68 and by other means whereby it may be adjusted about the axis of the pin so as to adjust the path of the delivery end laterally. The pin 68 is adapted to be inserted and withdrawn without requiring the use of a tool, but provision is made for holding it in coupling position so that it will not slip out of place excepting when it is intentionally withdrawn. As shown by Fig. 9 the pin is provided with an external annular groove 69, and one of the portions of the frame in which it bears is provided with a socket in which a spring-follower 70 is arranged. This follower is, to all intents and purposes, the same as shown by Fig. 8, including a screw plug 71 and a compression spring interposed between the plug and the follower. Pin 68 is arranged to extend from front to rear so that the raceway, in being adjusted about its axis, will shift the delivery end transversely of its lines of reciprocation. In order to provide for up-and-down adjustment an eccentric bushing 190 is set into the section 45 to receive pin 68 and may be held by a set-screw. This bushing has a head 191 to which a wrench may be applied to turn the bushing while the raceway is attached to the machine frame. The position of the raceway with respect to angular movement about pin 68 is fixed by the adjustable connecting means shown in section by Fig. 10 and shown otherwise by Figs. 3 and 12. This connecting means comprises two fixtures 72 and 73, the first of which is fastened to the main frame and the latter of which is adjustably fastened to section 45 by screws 74. The screw-receiving holes 75 in fixture 73 are larger than the screws in order to permit adjustment of 73 relatively to 45, but when the screws are set up tightly their heads bind parts 73 and 45 to each other so as to maintain the relation to which they are adjusted. Fixtures 72 and 73 are provided with holes for the reception of a stud 76, which holes are arranged to be brought into coaxial registration with each other by movement of the raceway about pin 68 and, if necessary, also by adjustment of fixture 73 relatively to raceway section 45. The stud-receiving hole in 73 is tapped, and end 77 of stud 76 is threaded to screw into it. The stud is provided with a head 78 by which fixtures 72 and 73 are drawn one against the other when the stud is set up tightly. This connection is intended to be used as follows when first attaching the raceway to the machine: Fixture 73 will, at first, be loosely connected to raceway section 45 by the attaching screws 74 which will be screwed in all but enough to bind the fixture to the raceway. The raceway will then be pinned to the frame by inserting pin 68. Fixture 73 will then be moved into registration with fixture 72 so that the stud 76 may be inserted into both fixtures, and the stud will then be screwed up tightly to bind the fixtures securely to each other. The loose play still afforded by the loose screws 74 and the clearance in holes 75 will leave the raceway free to be adjusted about pin 68 so that the delivery end of the raceway may be adjusted to a position where the center line of its delivery channel will intersect the axis of spindle 14. Now, while maintaining the raceway in the relation last described, screws 74 will be set up tightly to fix the raceway relatively to fixture 73. The forward and backward adjustment of the delivery end will be effected, as hereinbefore explained, by adjusting one or both of the eccentric pivot-studs 54 and 56. If, for any reason, it becomes necessary to detach the raceway from the machine, the only things necessary to be done before it can be detached are to push down the forward end of link 55, unscrew stud 76, and pull out pin 68. When the raceway is detached fixture 73 remains with it and maintains its prior position of adjustment relatively to the raceway, so that when the raceway is replaced it will necessarily return to its former position without requiring any repetition of the adjusting operation.

Eyelets are fed from hopper 47 into the upper section of the raceway by the device shown in Fig. 2. This device comprises a rotatable carrier 79 provided with a series of tufts of bristles 80. A ratchet wheel 81 is affixed to the stem of the carrier 79 but is arranged below the bottom of the hopper. A pawl 82 is arranged to oscillate about the axis of the ratchet to turn the latter step by step in one direction. This pawl is connected to pawl carrier 83 by a pivot pin 84, and is held in contact with the ratchet by spring 85. Pin 84 projects beyond the carrier 83 to receive one end of an operating link 86. This link is carried by a pivot pin 87 which in turn is carried by an arm 88. A tension spring 89 is connected at one end to the arm and at the other end to the link in such relation as to raise the forward end of the link and thus to keep the latter normally on pin 84. When detaching the raceway from the machine link 86 may be disconnected from pin 84 by simply depressing the link against the stress of spring 89. Arm 88 in the present instance is carried by the lever that operates the upper setting tool, said lever having a socket for the reception of a shank 90 formed on the lower end of the arm. A pin 91 is driven into the lever and passes through the shank 90.

Punching mechanism.

Figures 4, 5:
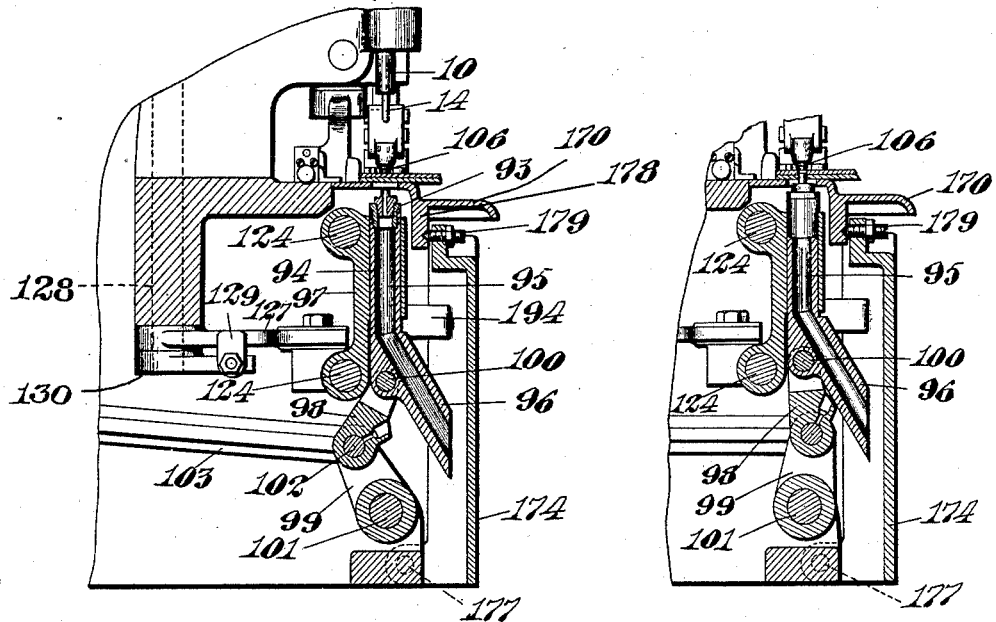
Fig. 4 represents a vertical section in a plane from front to rear through the mechanism that punches and feeds the work, the front of the machine being at the right-hand side of the figure.
Fig. 5 represents a view similar to Fig. 4 showing the lower punching tool as having punched a hole in the work.

According to the design illustrated the lower setting tool carries one of the members by which holes are punched in the work for the reception of the eyelets. As shown best by Fig. 21, this punching member, indicated at 92, is tubular and projects upwardly from the lower setting tool, being in fact integral with the latter. The punching tool not only punches the holes but it feeds the work in consequence of shifting the combined tool from one position where the hole is punched to the position where the eyelet is inserted and clenched. Referring to Fig. 4, the combined punching-and-setting tool is screwed into a bushing 93 and the latter is screwed into the upper end of a carrier or plunger 94. This carrier is provided with a duct 95 by which the punchings are conducted downwardly and are discharged at a level below the mechanism by which the tool is reciprocated in one direction for punching and in another direction for feeding the work. The lower portion of the carrier is inclined relatively to the upper portion and forms a discharge spout 96 for the purpose stated. The carrier is arranged to slide up and down in a laterally movable carriage 97, the up-and-down motion being imparted to it by toggle members 98, 99. The fulcrum pins 100 and 101 of the toggle members are arranged to intersect the axis of the punching tool, and the pivot pin 102 that connects the toggle members to form the knuckle is moved back and forth across the dead-center line by a link 103. The rear end of this link (see Fig. 3) is pivotally connected to a lever 104 which is mounted on pivot member 51. The lever is constructed and arranged to straddle a cam 105 carried by shaft 26. The cam moves the lever positively in opposite directions without lost motion. Fig. 4 shows the toggle members in their initial position, the punching tool being at its lowest point, and Fig. 5 shows the toggle links in their extreme forward position where the pin 102 is in front of the dead-center position. The effect of moving the toggle member beyond the dead center position is to relieve the pressure of the tool against the punch-block, hereinafter described, without withdrawing the tool from the work.

Figures 12, 13, 14, 15, 16:
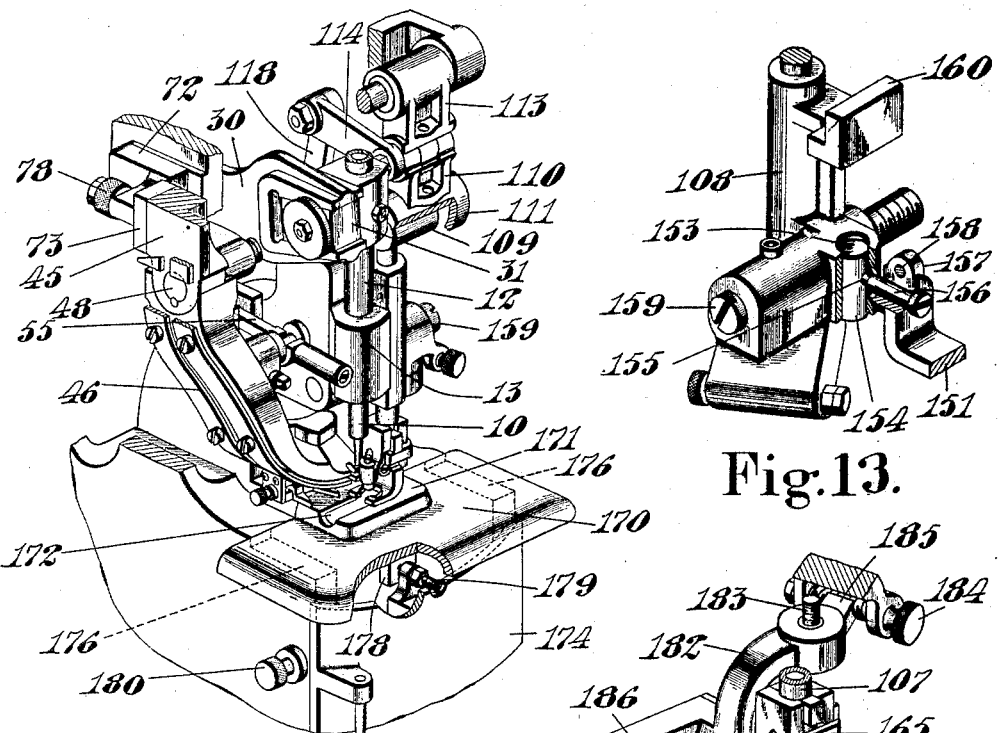
Fig. 12 is a perspective view including some of the principal elements at the front of the machine, the direction of view being approximately at right angles to that of Fig. 1.
Fig. 13 is a perspective view including a horizontally movable carriage by which the presser foot, the punch block, and the work-gage are shifted when the work-feeding mechanism is altered to change the length of the feeding steps. This same assemblage appears in Fig. 1 from a different point of view.
Fig. 14 is a perspective view including the presser foot, the punch-block, the gage, and a piece of work such as the lower portion of the left-hand side of a shoe-quarter.
Fig. 15 is a top plan view of the mechanism by which motion is transmitted from the work-feeding cam to the carriage that carries the feeding tool.
Fig. 16 is a perspective view, looking upwardly, of a detachable work-support along which the work is fed.

The punch-block 106 is shown best by Figs. 17 and 20 and is also shown in Figs. 12 and 14. It is affixed to a plunger 107 which remains stationary during the operation of the machine and is moved only when the work is being presented and removed and when the feeding mechanism is altered to change the length of the feeding steps. This plunger is arranged to slide up and down in a laterally adjustable carriage 108. Its upper end is provided with a head 109 of cylindric form (see Fig. 12), which has sliding connection with the lower end of a toggle member 110, the later having a partially cylindric socket 111 for the reception of the head. The upper end of toggle member 110 is connected by a pivot member 112 to toggle member 113 and also to a link 114. As shown by Figures 1 and 17 the upper part of member 113 is arranged between two confronting portions of the frame and is pivotally mounted on an eccentric sleeve 115, the eccentricity of which is utilized to adjust the punch block up and down. One end of the sleeve bears in one of said confronting portions and the other end is supported by a bolt 116 screwed into the frame. The sleeve is provided with a head 117 formed to take a wrench by which it may be turned to the desired position of adjustment. When the bolt is set up tightly its head binds the sleeve against rotation. A line intersecting the axes of toggle-members 110 and 113 also intersects the axes of toggle-members 98 and 99, thus insuring maximum rigidity of the punching couple.

The machine is provided with manually operable means for raising the plunger 107 through the medium of link 114. As shown by Fig. 12, the link 114 is pivotally connected to one arm of a bell-crank lever 118. This arm carries a stop-screw arranged to limit forward movement by impinging against a portion of the frame. See Figure 3. A tension spring 119 connected to the other arm of the lever normally keeps the stop-screw against the frame, in which position the lever keeps the knuckle joint of toggle members 110, 113 slightly in front of their dead-center position. The punch-block is thus sustained positively against upward movement when the punching tool 92 is acting against it, as shown by Fig. 18. A chain 120 (Fig. 1) is connected to the bell-crank lever 118 and extends downwardly to be connected to a treadle (not shown) whereby the knuckle of toggle members 110, 113 may be moved to the rear so as to lift the punch block.

The punching operation is effected as follows: Punching tool 92 is initially out of line with the upper setting tool but in line with the punch block, as shown by Fig. 17. The plunger 107 having been lifted to permit the work to be inserted under it, is released and automatically returns to its punching position under the influence of spring 119. Plunger 107 is thus locked positively against upward movement in response to upward pressure of the lower tool. When the punching mechanism is set in motion, as by tripping a clutch (not shown), shaft 26 is rotated and cam 105 operates the connections that transmit motion to the punching tool. The latter rises to the position shown by Fig. 18, thereby punching a hole in the work, and then goes down slightly to clear the punch-block. The punch remains in the work, however, and is then moved laterally from right to left until it stands in line with the upper setting tool 10, where it remains stationary while the upper tool moves downwardly to transfer an eyelet from the raceway to the work. The barrel of the eyelet slips along the punching tool, passes through the work, and is ultimately flared and clenched by the lower setting tool. After the eyelet has entered the work but before the clenching is completed toggles 98, 99 are moved to the rear, the movement being so timed as to place the toggles on dead-center at the instant when the upper tool reaches its lowest position. This, so far as I am aware, is a new mode of operation. It insures maximum rigidity of the lower tool, avoids forcing the work down into the recess in the work-support, relieves the link 103 from heavy stresses, and allows additional time for the return movement of the lower tool mechanism. The clenching is thus completed by simultaneous movement in opposite directions of the two setting tools. The two tools then immediately separate, the lower tool moving downwardly and the upper tool moving upwardly until they have reached their extreme positions of separation. During the downward movement of the lower tool the latter may move to the right until it again stands in line with the punch block.

Work-feeding mechanism.

Although the lower setting tool moves from side to side to feed the work toggle members 98, 99, do not partake of such movement, the pivot pin 100 being elongated as shown by Fig. 1 to enable carrier 94 to slide relatively thereto. Feed carriage 97 is arranged to slide on stationary rods 124. As shown by Fig. 15, a block 125 is connected to the feed carriage by a pivot member 126. An arm 127 straddles and engages the block. This arm constitutes one element of a bell-crank lever in which provision is made for adjusting the arm relatively to the mechanism by which it is oscillated. The arm is loosely mounted on a rockshaft 128 and is provided with lugs 129 between which an arm 130 is arranged. The latter arm is affixed to the rockshaft and is disposed below the arm 127 as shown by Fig. 4, thus serving as a support for arm 127. The lugs 129 are bored and tapped for the reception of adjusting screws 131, the latter being arranged to abut against opposite edges of arm 130 so as to transmit motion from the latter to arm 127 just as though the two arms were integral but affording adjustment of 127 relatively to 130. The rockshaft extends upwardly through a bearing formed in the main frame and is provided with an arm 132 above the bearing. This arm is affixed to the rockshaft.

Arm 132 is moved back and forth positively in both directions by a cam (not shown) carried by shaft 26, said cam acting directly on a horizontally movable plunger 133 the ends of which are arranged to slide in bearings 134. This plunger and its actuating cam are substantially the same as the corresponding elements shown by Figs. 3 and 8 in the aforesaid Patent No. 1,228,768. Referring to Fig. 15, plunger 133 and arm 132 are connected by links 135 and 136, the motion of the plunger being transmitted to the arm by these links. Pivot pin 137, by which the links are connected to each other, extends through a link 138 by which the path of motion of the other link may be varied to change the length of the resultant motion imparted to the feed-carriage. Link 138 is pivotally connected by a pin 139 to a manually movable regulating lever 140, said lever being mounted to oscillate on a pivot stud 141. A handle 142 formed on this lever is arranged to play back and forth on a stationary plate 143 in which holes 144 are formed. A stop pin 145 may be inserted in any one of the holes to determine the desired normal position of the regulating lever, the latter being held normally against the stop-pin by a tension spring 146. In some cases it is desirable to change the position of the regulating lever by means of a treadle, and for this purpose the machine is provided with a treadle rod 147 (see Fig. 3).

The upper end of this rod is connected to one arm of a bell-crank lever 148, the other arm of which is connected to regulating lever 140 by a link 149.

The above described mechanism for altering the feeding mechanism so as to change the length of the feeding steps does not affect the left hand limit of motion of the lower setting tool, the latter always dwelling in coaxial registration with the upper setting tool during the clenching period. It is only the right hand limit of feed motion which is affected by the regulating means, the lower setting tool being caused to move to a greater or lesser distance from the line of the operating tool. In order to insure registration of the setting tools link 135 and slide 133 are connected by an adjustable eccentric pivot member 192. By turning the latter while the setting tools are in telescopic relation pivot 137 may be adjusted to occupy coaxial relation with pivot stud 141, and thereafter the registration of the setting tools will be unaffected by shifting the regulating lever 140.

Whenever a change is made in the effective length of feeding motion a corresponding change occurs in the position of the punch block, so that the latter will be more or less distant from the line of the upper setting tool according to the length of feed-motion for which the feeding mechanism is adjusted. For this purpose the feed-regulating mechanism is connected to the laterally movable punch-block carriage 108 in such manner that the latter will move from side to side as the regulating lever 140 is moved to increase or decrease the length of the feeding motion. As shown by Fig. 15, the regulating lever 140 is provided with a cam groove 150 by which a lever 151 is shifted. This lever is loosely mounted on the upper end of rockshaft 128 as shown by Fig. 1, and is provided with a cam roll 152 that co-operates with cam groove 150. The forward end of lever 151 is connected to carriage 108 by a novel form of connecting means shown best by Fig. 13. A cylindric socket 153, the axis of which extends vertically, is formed in carriage 108. This socket is occupied by a cylindric block 154 capable of turning about its axis and of moving lengthwise relatively to the carriage. This block is bored transversely for the reception of the eccentric end portion 155 of a stud 156 carried by lever 151, the wall of socket 153 having a hole through which the stud extends. The hole is considerably larger than the stud in order to provide ample clearance for angular motion of the stud about the axis of lever 151. Furthermore the end 155 of the stud is free to slide endwise relatively to the block 154. The stud is clamped in a split portion 157 of the lever, the latter being provided with a bolt 158 by which the clamping effect is produced. If, through a slight error in machining, the punch block and punching tool 92 do not register correctly with one another, the error may be corrected by turning the stud 156 relatively to lever 151, the stud having a screw driver slot for this purpose.

When, for any reason, it is necessary to detach the carriage 108 from the machine, it may be disconnected from lever 151 by first loosening the clamping bolt 158 and then by withdrawing the stud 156 from block 154 and from the hole in the carriage.

Carriage 108 is arranged to slide horizontally on a stationary stud 159 screwed into and projecting from a portion of the main frame. The upper part of the carriage is formed with a flange 160 which slides in a groove formed in a stationary block 161 screwed or otherwise fastened to the frame. The stud 159 and lock 161 are so constructed and arranged that the carriage may be readily detached therefrom merely by sliding the latter far enough to disengage it. This same detaching motion disengages the cylindric head 109 of the punch-block-plunger from the toggle member 111.

*Presser-foot and work-support.*

The same plunger that carries the punch-block also carries a presser-foot 162 but the latter, while rigid in construction, per se, is movable relatively to the plunger and adapted to yield bodily. As shown by Fig. 11 the presser-foot is provided with two parallel legs 163, and these are arranged to straddle the lower part of the plunger and to slide in grooves formed in the latter. Notches 164 are formed in the legs and are occupied by portions 165 of a U-shaped keeper affixed to the exterior of the plunger by a screw 166 that is easily accessible. The notches afford relative movement of the presser-foot and the keeper, while the shoulders that define the ends of the notches coact with the portions 165 to limit such relative movement. The plunger is bored, as shown by Fig. 18 to provide a socket 167 in which a compression spring 168 is arranged, the lower end of the spring bearing on a portion of the presser foot to keep the latter normally depressed. The work-engaging portion of the presser-foot is arranged to bear on the work in advance of and at opposite sides of the punch-block, being cut out to form a recess 169 through which the punching tool 92 passes to punch a hole and through which it passes incidentally to feeding the work. When plunger 107 is raised to permit introduction or removal of the work the presser foot is raised by the keeper 165, the spring then depressing the work-engaging surface of the presser-foot below the level of the punch-block. When the work has been placed in position and the plunger has been depressed by its toggle-mechanism the punch-block is thereby depressed almost but not quite to the upper surface of the work, the clearance between the punch-block and the work being only enough to avoid interference with the feeding motion of the work. Consequently when the punch-block is depressed the presser-foot will be held against the work by the applied force of spring 168 and will be capable of rising slightly in opposition to the spring.

The work-support comprises a plate 170 the middle portion 171 of which is offset to a relatively high level and is arranged to cooperate with the presser-foot and with the work guide hereinafter described. The area of the raised portion includes the field of operation of the tools and facilitates manipulation of the work by providing sufficient space for the operative's fingers that take hold of the under side of the work. This raised portion is provided with a slot 172 through which the punching tool 92 passes in punching a hole and in which the lower setting tool moves incidentally to feeding the work. This slot extends to the left-hand extremity of the raised portion in order to provide an outlet through which the clenched portion of the eyelet may pass without encountering any obstruction.

An important feature of the invention relates to the relation and the mode of co-operation of the presser-foot and the punching device. When a punching operation is about to occur the bottom face of the punch-block, as previously stated, is slightly above the level of the work. As punching tool 92 rises it meets the punch-block as shown by Fig. 18, thereby forming a hole through the work and slightly lifting the presser-foot through the medium of the stock that bridges across the recess in the presser-foot. The punch-block, however, is rigidly sustained against punching motion of tool 92. As the punching tool recedes slightly from the punch-block after having punched a hole the presser-foot follows it downwardly to keep the work on the punch and also on the raised portion of the work-support. The work may be initially distorted slightly as shown by Fig. 18. Feeding motion follows immediately upon the slight downward motion of the punching tool, the presser-foot maintaining its downward pressure upon the work to keep the latter on the punching tool. As the tool moves laterally through recess 169 in the presser foot the initially distorted portion of the work in the vicinity of the punching tool is flattened by the portions of the presser foot that straddle the tool, so that as the latter passes out from the recess 169 it projects slightly above the upper surface of the work as shown by Fig. 19. The feeding movement continues until the feeding tool reaches the position shown by Fig. 20, where it dwells while the upper setting tool descends to insert an eyelet as hereinbefore explained.

The work-support embodies certain other features of novelty that contribute to the general efficiency of the machine and save considerable time in the operations of assembling it and taking it apart. The work-support is held in place partly by a dowel 173 and partly by a hinged front cover 174 with which the frame of the machine is provided. The dowel extends from front to rear and slips into a hole 175 (see Fig. 1). The work-support is sustained for the most part by confronting portions 176 of the frame, its rear edge abutting against that portion of the frame in which the dowel hole is formed. The feed-carriage and the toggle-mechanism by which the lower tool is operated are housed between the upstanding portions 176, the work support forming a detachable upper wall of such housing. The front wall of the housing is formed by the hinged cover 174, the hinge of which is provided by pivot members 177. The axis of the hinge is at the bottom of the cover so that the upper edge of the cover may swing forwardly and downwardly to open the housing. The work-support is provided with a lug 178 that projects downwardly from its under side so as to extend into the space formed by the housing, and the upper edge of the hinged cover co-operates with this lug to lock the work-support in operative position. In order to provide accuracy of coaction for this purpose the upper portion of the hinged cover is provided with an adjustable screw 179 arranged to abut against the lug. The outer end of this screw has a slot for the reception of a screw-driver and is accessible for adjusting when the hinged cover is closed, so that the rear edge of the work-support may be readily adjusted to the abutting shoulder of the frame, as shown by Fig. 4. The cover 174 is locked in closed position by pins or screws 180 arranged to extend through the side walls of the housing and into ears 194 on the cover. It will be seen, therefore, that these locking members not only have a direct locking effect on the hinged cover but, through the latter, they have an indirect locking effect upon the work-support. The lug 178 is preferably provided with a socket to receive the inner end of screw 179 so that the latter will prevent the work-support from being lifted from the portions 176.

*Work-gage and work-guide.*

The drawings include an improved work-gage and a guide for guiding the feeding movement of the work but since this feature is not a part of my invention I do not claim it but merely describe it briefly for purposes of identification. The work-guiding element is indicated at 181 in Figs. 14 and 23. It is formed upon a bracket 182 and the latter is pivotally connected to carriage 108 by a pivot stud 183. The bottom surface of this bracket bears partly on the main frame and partly on the raised portion of the work-support, as shown by Fig. 4, the frame and the work-support being flush in relation to each other where they meet. The guiding portion 181 is adjustable from front to rear by motion of the bracket 182 about stud 183. This adjusting motion may be effected by turning the screw 184, the latter being carried by carriage 108 and its screw-portion coacting with a counterpart screw-formation in a lug 185 formed on the bracket.

Bracket 182 is provided with two parallel horizontal slots 186 in which indicating members 187 and 188 are arranged respectively. Adjusting screws 189 (Figs. 22 and 23) are carried by bracket 182 and are mounted so that they will be capable of turning but not capable of relative endwise movement. The indicating members are bored and tapped to receive the screws 189 and are adjustable independently of each other as their respective adjusting screws are turned. Indicator 187 is intended to indicate the initial position of the lower edge of the left-hand quarter of a shoe, in which the first eyelet is set at the bottom, while the other indicating member is intended to indicate the initial position of the upper edge of the right-hand quarter, in which the first eyelet is set at the top. These indicating members as well as the guiding portion 181 partake of adjusting movement of the carriage 108 and are also adjusted collectively by screw 184.

Although, for the purpose of simplifying the drawings, no clutch has been shown, it is to be understood that shaft 26 will be provided with any suitable clutch and that the latter will be provided with controlling mechanism by which the shaft may be rotated continuously so long as the controller is held in the position that calls for power, and by which, when the controller is released, the clutch will disconnect the power automatically and cause the machine to stop when the parts are in the position represented by Figures 1, 4 and 17.

Having thus described my invention, what I claim as new and desire to secure by Letters Patent of the United States is:—

1. A fastener-inserting machine comprising a tubular punching tool arranged to go through the work from the underside of the work, a carrier for said tool, bearing means in which said carrier is arranged to slide, said carrier being provided with a duct arranged to conduct the punchings downwardly from the punching tool and discharge them below said bearing means, and mechanism for reciprocating said carrier.

2. A fastener-inserting machine comprising a tubular punching tool arranged to operate against the under side of the work, a carrier for said tool, and toggle mechanism connected to said carrier below said tool, said carrier having a duct arranged to conduct the punchings away from said tool and to discharge the punchings at a point laterally removed from the field of said toggle mechanism.

3. A fastener-inserting machine comprising a tubular punching tool arranged to go through the work from the under side of the work, a carrier for said tool, a feed carriage having a bearing portion through which the tool-carrier extends, and mechanism connected to said tool-carrier below said bearing portion to reciprocate the tool-carrier relatively to the feed-carriage, said tool-carrier having a duct extending through said bearing portion to conduct the punchings from said tool and to discharge them below the feed-carriage.

4. A fastener-inserting machine comprising means for supplying fasteners, a tubular plunger, a fastener-inserting tool carried by one end of said plunger, a spindle extending through said tool and said plunger for picking a fastener from said supplying means, and regulatable means arranged externally of but adjacent to the other end of said plunger to prevent said spindle from functioning.

5. A fastener-inserting machine comprising means for supplying fasteners, a tubular plunger, bearing means in which said plunger is arranged to slide, a fastener-inserting tool carried by one end of said plunger, a spindle extending through said tool for picking a fastener from said supplying means and also extending through the other end of said plunger and beyond said bearing means, and means arranged to coact with said spindle at the opposite side of said bearing means relatively to said tool to prevent the spindle from functioning.

6. A fastener-inserting machine comprising a plunger, a fastener-inserting tool carried thereby, means for reciprocating the plunger, means for supplying annular fasteners to said tool, a spindle extending through said tool to take fasteners one by one from said supplying means, said spindle having a head arranged externally of the plunger, a spring arranged to maintain the spindle normally in operative position relatively to said tool, and a stop adjustable to and from the path of said head to restrain the spindle, against the stress of said spring, from functioning.

7. A fastener-inserting machine comprising a plunger, a fastener-setting tool carried thereby, a collar surrounding said plunger, said collar and plunger having registering recesses forming a single key-socket, a key arranged in said socket to transmit axial movement from said collar to said plunger, and mechanism connected to said collar for operating said plunger.

8. A fastener-inserting machine comprising a plunger having an external groove extending transversely to the axis, a collar surrounding said plunger, a key arranged in said groove and projecting therefrom in lapped relation to said collar to transmit axial movement from the collar to the plunger, means arranged to keep said key in said groove, and means arranged to reciprocate said collar to operate the plunger.

9. A fastener-inserting machine comprising a fastener-setting tool, a plunger by which said tool is carried, and means for reciprocating said plunger, said means including a reciprocatory member and an expansible split ring each surrounding the plunger, the latter having an external annular groove in which said ring is seated so as to occupy lapped relation with said member.

10. A fastener-inserting machine comprising a fastener-setting tool, a plunger by which said tool is carried, and means for reciprocating said plunger, said means including a reciprocatory member having a bore through which the plunger extends, and a split ring, the plunger having an external annular groove and said ring being interlocked with said groove, the periphery of said ring being lapped with said member and the latter having an annular flange surrounding the ring to keep the latter interlocked with said groove.

11. A fastener-inserting machine comprising a punching member, a plunger for carrying said member toward and from the work, a carriage in which said plunger is arranged to slide, guiding means on which said carriage is arranged to slide transversely of said plunger, said carriage and guiding means having connecting portions formed to be interengaged and disengaged by sliding the carriage as aforesaid, and mechanism for operating said plunger, said mechanism and plunger also having connecting portions formed to be interengaged and disengaged by sliding the carriage as aforesaid.

12. A fastener-inserting machine comprising a plunger movable toward and from the work and a punching member carried thereby, toggle mechanism arranged to reciprocate said plunger, and a carriage in which said plunger is arranged to slide, said carriage being movable transversely of the axis of said plunger, said plunger and toggle mechanism having connecting portions formed to be interengaged and disengaged by moving the carriage as aforesaid.

13. A fastener-inserting machine comprising punching and feeding mechanism including a plunger movable toward and from the work, a work-engaging tool carried thereby, means arranged to operate said plunger, and a carriage in which said plunger is arranged to slide, said carriage being movable transversely of the axis of the plunger, said plunger and operating means having cylindric connecting portions formed to be interengaged and disengaged by moving the carriage as aforesaid and being relatively movable about the axis of said cylindric portions.

14. A fastener-inserting machine comprising two companion bearing portions spaced apart and having concentric bearings of different diameters, a fulcrum stud having two concentric portions of different diameters formed and arranged to fit in said bearings respectively and having an intermediate eccentric portion adapted to pass through the larger one of said bearings, a work-engaging tool, mechanism for operating said tool including a lever arranged on said eccentric portion of the stud, and means for holding said stud in various positions of rotative adjustment.

15. A fastener-inserting machine comprising a frame and a detachable carriage having cooperative connecting portions arranged to be interengaged by longitudinal movement of the carriage, a tool-holder carried by said carriage and arranged to move transversely of the path of the carriage, and mechanism arranged to reciprocate said tool-holder, said mechanism and the tool-holder having interlocking portions arranged to partake of relative sliding movement in lines parallel to the path of the carriage so as to permit connecting and disconnecting them by attaching and detaching the carriage.

16. A fastener-inserting machine comprising a frame and a detachable carriage having cooperative connecting portions arranged to be interengaged by longitudinal movement of the carriage, a tool-holder carried by said carriage and arranged to move transversely of the path of the carriage, and mechanism arranged to reciprocate said tool-holder, said mechanism and the tool-holder having cooperative head-and-socket portions arranged to transmit motion to the tool-holder and arranged to be connected and disconnected by attaching and detaching the carriage.

17. A fastener-inserting machine comprising a frame and a detachable carriage having cooperative connecting portions arranged to be interengaged by longitudinal movement of the carriage, a tool-holder carried by said carriage and arranged to move transversely of the path of the carriage, and mechanism arranged to reciprocate said tool-holder, said mechanism including toggle links, one of said links and said tool-holder having cooperative head-and-socket portions arranged to be connected and disconnected by attaching and detaching the carriage.

18. A fastener-inserting machine comprising a frame having two separate confronting portions, cooperative toggle members one of which is interposed between said confronting portions, cooperative tools for acting on the work, one of said tools being connected to said toggle members to be actuated thereby, a bushing having a concentric portion rotatably seated in one of said confronting portions and having an eccentric portion extending through said interposed toggle member and abutting against the confronting face of the other confronting portion, and a bolt extending through said bushing to clamp the latter against said confronting face and to sustain said eccentric portion against lateral stresses.

19. A fastener-inserting machine comprising fastener-inserting mechanism, two cooperative punching members one of which is arranged at one side of the fastener-inserting locality and the other of which is movable laterally to feed the work, and a presser-foot arranged to guide the work to clear said one of said punching members, said presser-foot having a recess through which said other punching member is movable first toward its companion punching member and thereafter toward the fastener-inserting locality.

20. A fastener-inserting machine comprising fastener-inserting mechanism, a holder, two cooperative punching members one of which is carried by said holder at one side of the fastener-inserting locality, and a presser-foot carried by said holder and arranged to guide the work to clear said one of said punching members, said holder being laterally adjustable to locate said one of said punching members and said presser-foot at various distances from said fastener-inserting locality.

21. A fastener-inserting machine comprising a movable tool-holder, a punch-block and a presser foot carried thereby, the presser foot and the tool-holder having relatively movable connecting portions, means arranged to limit the movement of the presser foot relatively to the holder, a spring arranged to move the presser foot relatively to the tool-holder, and means arranged to cooperate with the punch-block to punch the work and with the presser foot to feed the work.

22. A fastener-inserting machine comprising punching-and-feeding means including a punching-and-feeding tool and a stationary punch-block arranged to co-act with the latter, and a presser foot movable relatively to the punch-block and arranged to engage the same surface of the work in line with the path of the punched hole and in advance of the punch-block to prevent the work from catching on the latter.

23. A fastener-inserting machine comprising a guiding member having a bore, a plunger arranged to slide in said bore and having a socket extending lengthwise from one end, a presser-foot carried by and movable relatively to said plunger, a portion of said presser-foot being between said end and the work, and a spring arranged in said socket to act on said portion of the presser-foot.

24. A fastener-inserting machine comprising a work-support, a holder having two parallel guideways and a socket between them, a presser-foot having legs formed to be inserted into and withdrawn from said guideways, a spring arranged in said socket to maintain said presser-foot against the work, and detachable means forming a lost-motion connection between said presser-foot and said holder to retain them in assembled relation.

25. A fastener-inserting machine comprising a tool carriage, two cooperative punching tools one of which is mounted on said carriage, a lever for shifting said carriage, and means connecting the lever and the carriage for transmitting the shifting motion, said means comprising a swiveled block and a pin one of which is associated with the carriage and the other with the lever, the pin extending into the block at right angles to the axis thereof so as to slide relatively thereto.

26. A fastener-inserting machine comprising a tool carriage, two cooperative punching tools one of which is mounted on said carriage, a lever for shifting said carriage, and means connecting the lever and the carriage for transmitting the shifting motion, said means comprising a cylindric block mortised into one of the connected parts so as to turn about its axis and a pin carried by the other one of said parts and extending into the block at right angles to said axis so as to slide relatively to the block.

27. A fastener-inserting machine comprising two cooperative punching tools, a carriage for shifting one of said tools laterally, a lever for moving the carriage, and means for transmitting motion from the lever to the carriage comprising a cylindric block mortised into one member of the couple so as to turn about its axis and to move endwise relatively to that member, and a pin secured to the other member of the couple and having an eccentric end portion extending into the block at right angles to the axis of the block so as to slide relatively to the block, the pin being adjustable rotatively about its axis to adjust the carriage relatively to the lever.

28. A fastener-inserting machine comprising coperative tools for clenching the fasteners in the work, and a work-support having two work-supporting portions at different levels, the higher portion of which is relatively close to the clenching locality and so far above the level of the lower portion that the tips of the operative's fingers may grasp the upper and lower sides of the work adjacent to the higher portion without lifting the work from the latter.

29. A fastener-inserting machine comprising cooperative tools for punching and feeding the work and for attaching fasteners thereto, and a work-support having a supporting portion at a relatively high level including the range of operation of said tools and having a supporting portion at a lower level, outside said range, over which the tips of the operative's fingers may pass with the work to maintain a gripping hold without lifting the work from said higher supporting portion.

30. A fastener-inserting machine comprising mechanism arranged to punch and to feed the work and to attach fasteners thereto, said mechanism including a fastener-clenching tool that punches and feeds the work, and a work-support having a supporting portion at a relatively high level in which a slot is provided for the reception of said tool, and also having a supporting portion at a lower level.

31. A fastener-inserting machine comprising cooperative tools for clenching the fasteners in the work, and a work-support the middle portion of which is offset above the general plane of the work-support and provided with a hole to receive one of the tools, said hole intersecting one edge of said offset portion to provide clearance for that part of the fastener that is on the under side of the work.

32. A fastener-inserting machine comprising a frame and a detachable work-support having cooperative connecting portions constructed and arranged to guide the work-support to operative position, upper and lower setting tools, mechanism for operating the lower tool, a guard for said mechanism movably connected to the frame so as to lock and to unlock the work-support, and means for maintaining the guard in locking position.

33. A fastener-inserting machine comprising a frame and a detachable work-support having cooperative connecting portions arranged to be interconnected by relative edgewise movement of the work-support, a member pivotally connected to the frame so as to swing to and from lapped relation with a portion of the work-support, and means for maintaining said member in said lapped relation to lock the work-support through the medium of said member.

34. A fastener-inserting machine comprising a frame having two separate confronting housing portions and a movable housing member pivotally connected thereto so as to close and open the housing, means for maintaining said member in closed position, and a detachable work-support constructed and arranged to form the upper wall of the housing, the frame and the work-support having cooperative connecting portions arranged to be interconnected by relative edgewise movement of the work-support when the pivoted member is open, and the work-support being arranged to be locked in connected relation by the pivoted member when the latter is held in closed position.

35. A fastener-inserting machine comprising two co-operative setting tools movable toward and from each other and mechanism arranged to actuate them so as to cause first one and then the other to act on the work, to cause the first said tool to dwell in contiguous relation to the work while the second tool moves partway toward the first tool, and to cause movement of the first tool toward the second tool during the final stage of movement of the second tool toward the first tool.

36. A fastener-inserting machine comprising a fastener-inserting tool and a clenching tool movable toward and from each other, and mechanism arranged to actuate the tools so as to cause a sequence of movements as follows, viz, movement of the clenching tool to contiguous relation with the work, movement of the inserting tool to insert a fastener in the work while the clenching tool dwells in said contiguous relation, and simultaneous movement of the tools toward each other to clench the fastener.

37. A fastener-inserting machine comprising a fastener-inserting tool and a clenching tool movable toward and from each other, mechanism for moving the fastener-inserting tool toward and from the clenching tool, and toggle-mechanism for moving the clenching tool toward and from the inserting tool, said toggle-mechanism being arranged to operate according to the following timed relation, viz, first to move the knuckle of the toggle from its initial position at one side of the dead-center position to and slightly beyond the latter position so as to move the clenching tool to contiguous relation with the work prior to insertion of the fastener by the other tool, then to maintain the knuckle stationarily beyond the dead-center position during the inserting movement of the other tool, and then to move the knuckle in the reverse direction toward the dead-center position to clench the fastener.

38. A fastener-inserting machine comprising a fastener-inserting tool and a punching-and-clenching tool movable toward and from each other, mechanism for moving the inserting tool toward and from the clenching tool, and toggle-mechanism for moving the punching-and-clenching tool toward and from the inserting tool, said toggle-mechanism being constructed and arranged to shift the knuckle of the toggle across the dead-center position to punch the work and to have it at said dead-center position at the instant of maximum clenching pressure.

39. A fastener-inserting machine comprising two cooperative fastener-clenching tools movable toward and from each other, toggle-mechanism for moving one of said tools toward and from the other, said mechanism being constructed and arranged to move the knuckle of the toggle across the dead-center position to opposite sides of the latter, mechanism arranged to move said toggle-operated tool laterally to feed the work, and mechanism for moving the other tool so as to cause maximum clenching pressure at the instant when the knuckle is at said dead-center position.

40. A fastener inserting machine comprising a combined punching-and-clenching tool, a punching tool arranged to act conjointly with the first said tool to punch the work, and toggle-mechanisms arranged to move said tools respectively toward and from each other, the pivotal axes of the toggle-members of both said mechanisms being arranged to intersect a line common to all.

41. A fastener-inserting machine comprising regulatable work-feeding mechanism, an adjustable punch-block, and an adjustable work-gage, said punch-block and work-gage being connected to said work-feeding mechanism so as to partake of fastener-spacing regulation of the latter.

42. A fastener-inserting machine comprising regulatable work-feeding mechanism, an adjustable punch-block, and an adjustable work-gage, said punch-block and work-gage being coupled so as to be adjustable in unison and being arranged to partake of regulation of said feeding mechanism.

43. A fastener-inserting machine comprising regulatable work-feeding mechanism, a punching device arranged to move toward and from the work, a carriage for guiding said punching device and for shifting it laterally, said carriage being arranged to partake of regulation of said feeding mechanism, and a work-gage coupled to said carriage so as to partake of said regulation.

44. A fastener-inserting machine comprising fastener-inserting mechanism including a tool arranged to punch a hole in the work, a laterally adjustable member, a punch-bed and a work-gage both carried by said member to partake of lateral adjustment thereof, and means arranged to operate said tool to feed the work relatively to said punch-bed and said work-gage.

45. A fastener-inserting machine comprising fastener-inserting mechanism including a tool arranged to punch a hole in the work, a laterally adjustable member, a presser-foot and a work-gage both connected to said member to partake of lateral adjustment thereof, and means arranged to operate said tool to feed the work relatively to said presser-foot and said work-gage.

46. A fastener-inserting machine comprising fastener-inserting mechanism including a tool arranged to punch a hole in the work, a laterally adjustable unit comprising a punch-bed, a work-gage and a presser-foot, and mechanism arranged to operate said tool first to punch the work against said punch-bed and thereafter to feed the work relatively to said laterally adjustable unit.

47. A fastener-inserting machine comprising fastener-inserting mechanism including a tool arranged to punch a hole in the work, a laterally adjustable unit comprising a punch-bed, a presser-foot, and a work-gage, said presser-foot being movable relatively to said work-gage to facilitate insertion of the work, and mechanism arranged to operate said tool first to punch the work against said punch-bed and thereafter to feed the work relatively to said laterally adjustable unit.

48. A fastener-inserting machine comprising a work-table, an adjustable unit adjustable along lines parallel to the plane of said table and including a work-gage and a punching element, and a movable unit arranged to move toward and from said table and including said punching element and a presser-foot.

49. A fastener-inserting machine comprising a tool arranged to punch a piece out of the work, a plunger to which said tool is fixed, and a bearing in which said plunger is arranged to slide, said tool and said plunger having ducts forming a continuous passageway extending through the entire length of said bearing to conduct the punched pieces from the punching locality to a point of discharge at the opposite side of said bearing.

50. A fastener-inserting machine comprising a plunger, a detachable collar adapted to slide thereon for assembling purposes, a groove being formed partly in said plunger and partly in said collar to surround said plunger, a metal ring embedded in said groove to transmit axial movement from one of said grooved members to the other, and mechanism arranged to actuate one of said grooved members.

51. A fastener-inserting machine comprising a tool for operating on the work, a bearing member engaging said tool to control its path of movement toward and from the work, said bearing member being movable to shift said tool transversely of said path, and toggle mechanism arranged to move said tool toward and from the work, said mechanism including an angularly movable member and said tool and said angularly movable member having cylindric connecting portions adapted to be assembled in cooperative relation by relative shifting transversely of said path.

52. A fastener-inserting machine comprising punching mechanism and regulatable work-feeding mechanism including a tool arranged to punch and feed the work, said punching mechanism also including a punch-bed adjustable laterally to various operative positions, means arranged to regulate said work-feeding mechanism and adjust said punch-bed in consonance with such regulation, and a work-gage arranged to partake of such adjustment of the punch-bed.

53. A fastener-inserting machine comprising a fastener-inserting tool and mechanism for operating it, a tool for punching and feeding the work and clenching the fasteners, a punch-bed, a toggle arranged to operate the latter said tool, and mechanism arranged to shift said toggle twice, in opposite directions, across the dead-center position to impart four motions to the tool operated thereby, viz, first, a motion against said punch-bed, second, a motion away from the punch bed, third, a motion toward the fastener-inserting tool to apply the maximum clenching pressure to the inserted fastener, and fourth, a motion away from the clenched fastener.

54. A fastener-inserting machine comprising a fixed work-support, a holder having two parallel guideways and a socket between them, a presser-foot having legs formed to be inserted into and withdrawn from said guideways, a spring arranged in said socket to maintain said presser-foot against the work on said work-support, and means detachably connected to said presser-foot for retracting the latter to permit insertion and removal of an article of work.

In testimony whereof I have signed my name to this specification.

PERLEY R. GLASS.